W. O. DALY.
TURPENTINE APRON.
APPLICATION FILED MAY 19, 1911.
1,040,900.
Patented Oct. 8, 1912.
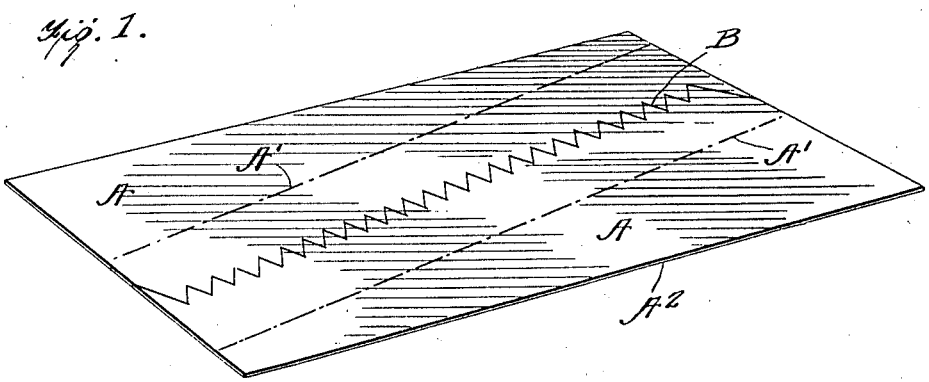
Fig. 1.
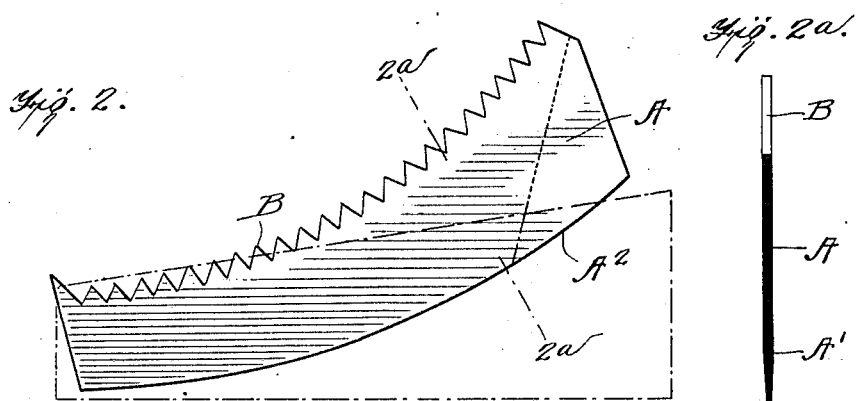
Fig. 2.
Fig. 2a.
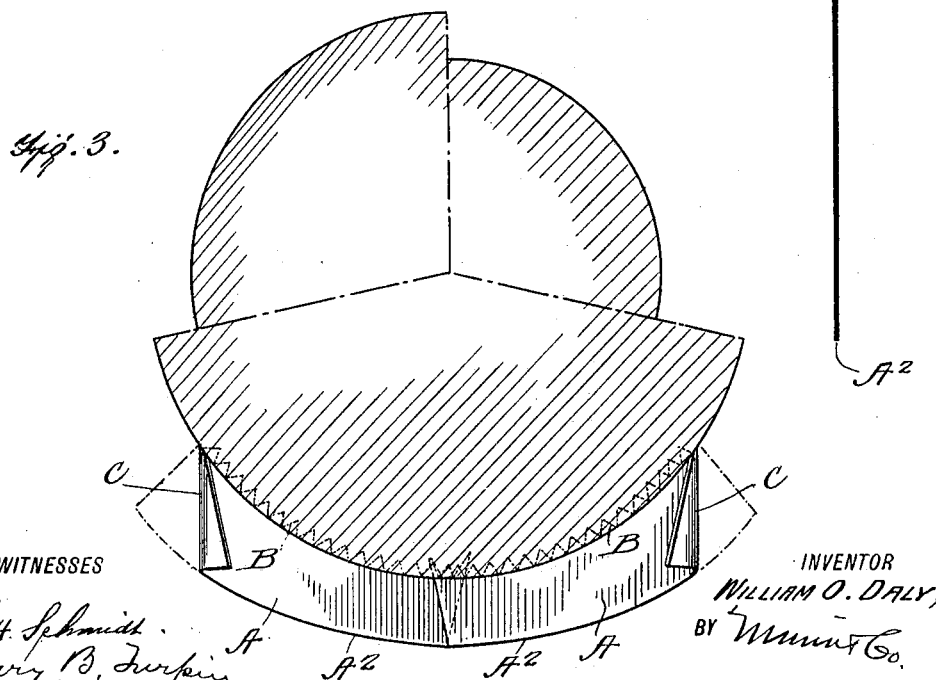
Fig. 3.
WITNESSES
L. H. Schmidt
Perry B. Turpin
INVENTOR
WILLIAM O. DALY,
BY
ATTORNEYS

UNITED STATES PATENT OFFICE.

WILLIAM O. DALY, OF MOBILE, ALABAMA.

TURPENTINE-APRON.

1,040,900.  Specification of Letters Patent.  Patented Oct. 8, 1912.

Application filed May 19, 1911. Serial No. 628,246.

*To all whom it may concern:*

Be it known that I, WILLIAM O. DALY, a citizen of the United States, and a resident of Mobile, in the county of Mobile and State of Alabama, have invented certain new and useful Improvements in Turpentine-Aprons, of which the following is a specification.

This invention is an improvement in the aprons for use in connection with turpentine cups in collecting the turpentine from trees and the invention has for an object to provide a novel construction of apron which can be cheaply made without any waste of the sheet material and which will be efficient in use and can be readily utilized in connection with trees of large or relatively small diameter and in which the sections of the apron, when the latter has been made, may also be utilized in connection with large or small trees and the invention consists in certain novel constructions and combinations of parts as will be hereinafter described and claimed.

In the drawings Figure 1 is a perspective view of the plate from which two aprons are formed, the serrated line dividing the two aprons being shown. Fig. 2 is a top plan view of one of the aprons after it has been curved into its ultimate form. Fig. 2ª is a detail cross section, slightly enlarged, on about line 2ª—2ª of Fig. 2. Fig. 3 is a top plan view showing two aprons applied to a tree of a given diameter, trees of relatively smaller diameter being shown in the same figure for purposes of illustration.

In the construction of turpentine aprons, it is important not only to provide an efficient apron, but to also construct the same so it can be conveniently applied to a tree and can be produced at a small initial cost. In securing the latter result, it is necessary to dispense with waste of material as far as possible and in carrying out my invention I avoid all waste of material by utilizing in the production of the aprons every portion of the blank sheet from which the apron is produced. To this end, I take the rectangular sheet such as shown in outline in Fig. 1 and which may be a part cut off from a stock or other suitable sheet of the desired size and I divide this sheet into two sections A, A, which are alike, by means of a diagonal line of separation which I have indicated at B and have shown in the form of a waved line so shaped as to produce on the meeting edges of the two plates A, A, a row of serrations B which when the plate has been bent into curved form as shown in Fig. 2 operate to enter the tree in the application of the apron as shown in Fig. 3 and secure the apron in place, the gummy action of the turpentine aiding in holding the apron in position on the tree as will be well understood by those skilled in this art. Manifestly, however, if the serrations B are extended on approximately a straight line, it will be difficult to utilize the aprons to advantage on trees of the usual round shape and I, therefore, provide for curving the plate from the form shown in Fig. 2. This may be effected in various ways, but I prefer to secure the result by passing the plate A such as shown in Fig. 1 between rolls which are caused to operate on that portion of the plate A lying between the dotted line A' and the outer edge A² of the plate in such manner as to reduce the thickness of this portion of the plate and by spreading such portion of the plate longitudinally because of its reduction of thickness, I bring the entire plate to the curved form shown in Fig. 2, thus producing the specific plate forming my apron and which will be defined in the accompanying claims. I thus produce an apron consisting of a flat plate of metal which is curved from end to end and has at its inner edge a series or row of teeth B which extend on a curved line whereby they coincide approximately with the curvature of a tree, the portion of the plate adjacent to its outer edge or edge opposite the series of teeth being reduced in thickness relatively to the toothed edge. This construction of apron plate is not only desirable because it results in the bending of the flat plate into the curved form as shown and before described, but I also secure by this formation the maximum width of the plate transversely and also the provision of a plate in which the teeth have the maximum thickness, thus increasing the hold of the said teeth in the tree when driven therein as well as permitting the application of considerable force in driving the teeth into a tree without the bending or other displacement of the teeth. I, therefore, have provided an apron plate which has a novel specific construction, in that it is curved from end to end, is provided along its inner curved edge with a row of teeth and has its portion adjacent its opposite edge reduced in thickness so that I provide as before stated out of the same material an apron plate of the maximum width whose teeth extend on a curved line to conform to the tree, with its teeth of the maximum thickness.

After the apron has been applied to the tree which is effected in the manner more fully described hereinafter, the wider end of the apron is bent up and inwardly slightly as shown at C in Fig. 3 in the usual manner.

In practice, the apron is preferably formed of sheet metal such, for instance, as galvanized iron.

In applying the aprons to a tree, they are ordinarily used in pairs as shown in Fig. 3 with the inner end of one apron lapping slightly below the inner end of the other and after the aprons have been applied to a tree, the corners C are bent back as shown in Fig. 3.

While the full length apron may be adapted to a tree of large diameter as shown at the bottom in Fig. 3, it may be cut off at the end to adapt it to trees of smaller diameter as shown in the upper portion of said Fig. 3 and in some instances the portions trimmed off from a full length apron may be utilized and combined to form an apron for a smaller tree and may also be used to supplement the full length apron in applying the same to an unusually large tree, the capacity for the adaptation of the cut off portions being readily apparent to a person engaged in applying aprons to turpentine trees.

In pointing out the special advantages of my turpentine apron having the saw tooth edge adapted to be driven into a tree, the ease with which the apron is applied, the fact that its application does not injure the tree and the further fact that the apron can be adjusted later in the spring than other aprons because it is unnecessary to face the tree into the hard pine, should be considered.

For a long while the United States Government has been urging owners and operators of pine timber land to practice such methods as tend to preserve the timber and prolong its life of usefulness. In no other way does the turpentine tree suffer so much damage as in the adjustment of the apron according to the methods heretofore practiced as in such adjustment of the apron the timber suffers the damage in the multiple form since it is customary to adjust as many as three or four aprons to each three of ordinary size. This adjustment ordinarily requires three men, the first man holding the keen edge of a huge blade or ax against the tree while the second man strikes the ax with a heavy wooden mallet driving the ax into the tree some one and one-half to two and one-half inches while the third man drives the metal apron by a suitable hammer into the gash cut in the tree until the apron catches into the timber. When the cup is thus applied to small timber, a heavy wind swaying the tree will frequently spread the gash and the apron adjusted therein will slip out and fall to the ground, losing all the pitch that flows thereafter until the next round of the dipper which may be two or three weeks.

In the use of the saw tooth apron, its adjustment requires but one man who by a suitable tool may drive the apron into the tree in such manner that the saw tooth edge will bite through the bark and enter the solid portion of the tree in such manner as to securely hold the apron in position. When so applied, the apron will remain in position and yet can be conveniently pulled out when desired, or knocked out by the tap of a hammer and as it enters the tree to such a small extent, limited by the length of its teeth, it will cause no injury whatever to the tree so that its use leaves the tree unimpaired for further crops of turpentine.

Another important feature of my apron is that it can be safely adjusted later in the spring than any other as it is not necessary to box the tree but the apron can be applied as before described and then the tree be scraped in such manner as to secure a considerable flow of turpentine and this scraping will not injure the tree as would be the case as if the ordinary box were formed.

I claim:

1. An apron for turpentine cups composed of a plate of sheet metal curved from end to end and provided along its inner curved side with a series or row of serrations forming teeth and having its portion adjacent to its opposite or outer edge reduced in thickness throughout whereby with a given weight of material, is secured a maximum width of apron and a maximum thickness of teeth, substantially as and for the purposes set forth.

2. An apron consisting of a flat plate of metal which is curved from end to end and has at its inner edge a series or row of teeth which extend on a curved line whereby they coincide approximately with the curvature of a tree, the portion of the plate adjacent to its outer edge or edge opposite the series of teeth being reduced in thickness relatively to the toothed edge, substantially as set forth.

3. An apron for turpentine cups formed of sheet metal, curved from end to end on the arc of a circle and provided along its inner edge with teeth or serrations with the adjacent teeth adjoining whereby said edge presents an uninterrupted saw tooth edge, the apron being made of greater width at one end, substantially as set forth.

4. An apron for turpentine cups consisting of a plate of metal toothed along one edge and curved inwardly on said edge and having its other edge reduced in thickness relatively to its toothed edge.

5. A turpentine apron substantially as described, consisting of a plate of metal curved inwardly at one edge and having said edge formed with adjoining teeth forming an uninterrupted saw tooth edge, substantially as set forth.

6. A turpentine apron consisting of a sheet of metal having a saw tooth edge adapted to be driven into a tree.

7. An apron consisting of a sheet of metal incurved at one edge and provided along the same with saw teeth adapted to be driven into a tree.

WILLIAM O. DALY.

Witnesses:
August C. Radue,
Solon C. Kemon.

Copies of this patent may be obtained for five cents each, by addressing the "Commissioner of Patents, Washington, D. C."